March 6, 1934.    W. S. BAYLIS    1,949,673
VAPOR PHASE TREATMENT OF OILS
Filed May 2, 1927
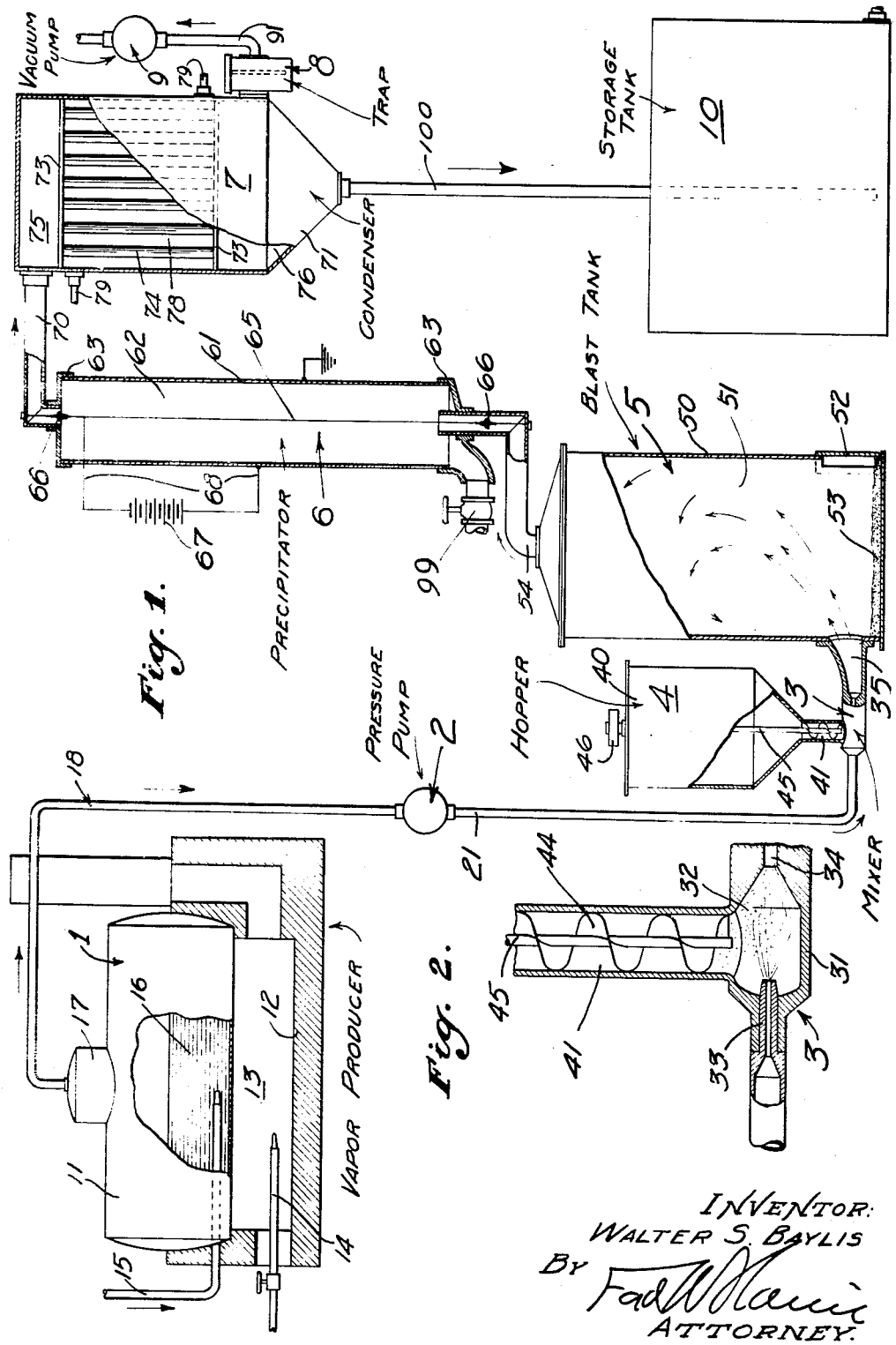
INVENTOR:
WALTER S. BAYLIS
BY
ATTORNEY.

Patented Mar. 6, 1934

1,949,673

UNITED STATES PATENT OFFICE 1,949,673

VAPOR PHASE TREATMENT OF OILS

Walter S. Baylis, Los Angeles, Calif., assignor, by mesne assignments, to Patco, Inc., Los Angeles, Calif., a corporation of California Application May 2, 1927, Serial No. 188,119

19 Claims. (Cl. 196—96)

My invention relates to purifying methods and particularly to a method of purifying vapors and especially vapors produced from organic or inorganic oils.

One advantageous use of my invention is in the petroleum oil refining industry. This use will be described as illustrative of the method and apparatus used in practicing one embodiment of my invention. Petroleum distillates may be produced from crude petroleum in the following manner. The crude petroleum is placed in a still and heated to a temperature at which vapors are given off. These vapors are then conducted to a condenser where they are condensed into a liquid. The petroleum distillates ordinarily contain impurities which are present in the petroleum before distillation, or which are formed by a decomposition of the petroleum during distillation. In my invention I purify the petroleum vapors before they are condensed.

Various impurities may be carried over or formed in the distillates produced in the ordinary refining of petroleum in which the oil is heated under conditions which separate it into its constituent parts without materially changing its characteristics, and my invention is applicable to such processes.

My invention is also applicable to distillates produced by the so-called cracking processes in which the petroleum is heated under heavy pressure to temperatures at which the molecular structure of the oil is materially altered, the vapors produced under these conditions being usually known as "cracked" vapors and containing considerable quantities of impurities which can also readily be removed by my invention.

The impurities found in various types of petroleum vapors include gummy or resinous bodies which impart a very objectionable dark color to the distillates condensed from said vapors. Many inventors have worked upon the problem of removing these impurities from the condensed liquids, using acids or alkalies or both, either with or without mechanical filtration. My invention differs from these earlier processes in that the petroleum is purified while still in the vapor phase, that is, while the petroleum is in the form of dry gas prior to its condensation.

It has been attempted to refine petroleum vapors by passing these vapors through various forms of filter media. My invention differs from these previous attempts in that the purification of the vapors is accomplished by bringing the vapors into direct contact with finely comminuted solid adsorbent material which is brought into contact with the vapors in the form of moving dust cloud. This material is preferably a chemically treated adsorbent material formed by subjecting certain natural clays to acid treatment in such a manner as to render them highly active. In practice I often find it desirable to incorporate with the adsorbent material, which is preferably free from water, a small percentage of acid, preferably sulphuric acid, to the amount of less than five per cent by weight of the dry adsorbent. The adsorbent then acts as a carrier for the acid.

Other objects and advantages of the invention will be made evident hereinafter.

In the following description I will describe my invention as used in removing impurities from petroleum spirit vapors. My invention may be successfully employed for treating other vapors, permanent or temporary, and therefore my invention is not limited to this particular use which will now be described.

Referring to the drawing in which I diagrammatically illustrate an apparatus suitable for carrying on the method of my invention, Fig. 1 is a diagrammatic view of a complete apparatus.

Fig. 2 is a detailed view of a mixer of the invention.

In the drawing, 1 is a vapor producer or still, 2 is a pressure pump, 3 is a mixer, 4 is a hopper, 5 is a blast tank or settling tank, 6 is a precipitator, 7 is a condenser, 8 is a trap, 9 is a vacuum pump, and 10 is a storage tank.

The vapor producer 1 may be any suitable type of still. As shown diagrammatically, 11 is a tank supported by a fire-brick furnace 12. The furnace 12 provides a fire-box 13 in which a burner 14 is located. Petroleum or other substance from which the vapor is to be formed is delivered to the tank 11 by means of a pipe 15, the petroleum forming a body 16 in the tank 11. The tank 11 is provided with a dome 17 to which a vapor take-off pipe is connected.

The pressure pump 2, as illustrated, is connected in the vapor take-off line 18 and is provided for the purpose of placing a pressure on the vapor in the lower part 21 of the vapor take-off line 18. Where the still 1 is operated at high pressure, the pump 2 may be dispensed with.

The vapor take-off line 18 is connected to the mixer 3. As illustrated in Fig. 2, the mixer 3 is provided in the form of an injector having a body 31 providing a mixing chamber 32. Extended into the mixing chamber 32 is an injector nozzle 33. Opposite the injector nozzle 33 is a throat 34 which is provided for the purpose of obtaining a high velocity of the vapor, as will be explained hereinafter. The throat 34 connects with a mouth 35 which connects to the blast tank 5.

The hopper 4 consists of a closed tank 40 having a narrow and long throat 41 provided at the lower end thereof. The lower end of the throat 41 is connected to the mixing chamber 32. Placed in the throat 41 is a feed screw 44. The feed screw 44 is provided at the lower end of a shaft 45 which extends upward through the tank 40 and is provided with a means whereby it may be rotated, such means in the drawing being illustrated as a pulley 46.

The hopper 4 is adapted to retain a supply of adsorbent material. This material is preferably a finely divided chemically treated activated adsorbent agent. It is essential that it be very finely divided so that it can remain in suspension in the form of a dust cloud in the vapors being treated. I prefer to use an adsorbent material known in the art as "Filtrol" which is a special acid-treated clay having a high adsorptive capacity. The shaft 45 when rotated operates the feed screw 44 so that a measured amount of adsorbent material is delivered to the mixing space 32 where it is mixed with the vapor.

The mouth 35 of the mixer 3 is connected to the lower part of the blast tank 5. The blast tank 5 consists of a closed shell 50 which provides a blast or settling chamber 51. The mouth 35 connects to the lower part of the chamber 51 so that the mixture of vapor and adsorbent material may pass upward therein. A removable door 52 is provided at the lower part of the shell 50 closing an opening through which settled particles 53 which are disassociated from the vapor may be removed therefrom. Connected to the upper end of the blast tank 5 is a delivery pipe 54 which is connected to the precipitator 6.

The precipitator 6 is diagrammatically illustrated in the drawing and consists of a shell 61 which serves as a grounded outer electrode and which provides a treating passage 62 through which the vapors are conducted. At opposite ends of the shell 61 are heads 63 which close the treating space 62 from the surrounding space. The delivery pipe 54 is connected to the lower head 63 so that it delivers vapor into the lower end of the treating space 62. Extended centrally through the treating space 62 is a central electrode 65 which is the high tension electrode and insulated from other parts of the apparatus by insulators 66. A source of energy indicated at 67 is connected to the electrodes 61 and 65 by wires 68. An electric field is established in the treating space 62, which separates the solid particles from the vapor. Connected to the upper head 63 is a vapor-receiving pipe 70 which is extended to the condenser 7. The lower part of the precipitator 6 is supplied with a valve or gate 69 through which the deposited material may be withdrawn from time to time.

The condenser 7 consists of a shell 71 which is completely closed, upper and lower intermediate heads 73, and vapor pipes 74. An intake chamber 75 is provided at the upper end of the condenser 7 to which the vapor-receiving pipe 70 is connected. An exhaust chamber 76 is provided at the lower end of the condenser 7. The vapor pipes 74 connect the two chambers together. Between the heads 73 is provided a cooling water circulating space 78 through which water is circulated by means of pipes 79. The vapor which has been cleaned in the precipitator 6 passes into the space 75 and drops through the vapor pipes 74 where it is considerably reduced in temperature.

The vapor is drawn through the apparatus described by means of the vacuum pump 9 which is connected to the exhaust chamber 76 of the condenser 7 by means of a pipe 91 and the trap 8. Permanent gas passes from the exhaust chamber 76 through the trap 8, the pipe 91 and through the vacuum pump 9.

Connected to the lower part of the condenser 7 is a condensate pipe 100 which is extended to the storage tank 10. The condensates are delivered to the storage tank 10 by means of the condensate pipe 100. The condensates which are the desired petroleum spirit are retained in the storage tank until they are shipped or subjected to other treatment.

The complete method of the invention is conducted as follows.

The function of the vapor producer 1 is to produce vapors from the petroleum or other substance. The body of liquid 16 is heated by means of the flame in the firebox 13 to a sufficient degree to produce petroleum vapors. If it is desired to crack the oil the distillation is carried on at high temperatures and under considerable pressure. The vapors pass through the vapor take-off line 18 and to the pressure pump 2, unless the pressure in the still 1 is sufficiently high to allow the pump 2 to be dispensed with. In either event the vapors are present in the lower part 21 of the vapor take-off line 18 at sufficiently high pressure to obtain an injecting action in the mixer 2 which will cause a thorough mixing of the vapor and the adsorbent material. The vapor passes into the mixer 3 through the nozzle 33 and the mouth 35 at a high velocity. The feed screw 44 is at this time in operation and is delivering the finely divided adsorbent material continuously at a certain rate of speed into the mixing chamber 32. It is desirable to supply to the mixer only as much absorbent material as the vapor is capable of carrying. In treating some oils the adsorbent material may carry something less than five per cent by weight of sulphuric acid. In the mixing chamber 32 the vapor and adsorbent material are thoroughly mixed. This mixture passes through the throat 34 at a high rate of speed, passing through the mouth 35 into the chamber 51. The adsorbent material is thus brought into intimate contact with the vapor and removes the impurities therefrom.

The mixture of vapor and adsorbent material is blasted into the chamber 51 in the form of a cloud, by reason of the high velocity and by reason of its freedom to expand in the chamber. This expansion is of course facilitated by the partial vacuum in the chamber 51 which also prevents condensation of the vapor due to the lowering of its vapor pressure. The adsorbent material rapidly becomes loaded with impurities taken from the vapor and a considerable portion drops to the bottom of the chamber 51 as indicated at 53, being periodically removed through an opening closed by the door 52. The cloud of vapor and adsorbent material is drawn upward through the blast tank 5 by reason of the suction exerted by the vacuum pump 9. The cloud is passed through the pipe 54 into the treating space 62 of the precipitator. The electric field existing in the treating space 62 charges the solid particles of the cloud, causing them to pass outward in the treating space to the inner face of the shell or outer electrode 61. These particles collect on the inner face of the shell 61 and thereafter drop along this face to the bottom of the precipitator. The vapor freed from the adsorbent material passes out of the upper end of the precipitator into the vapor-receiving pipe 70. The vapor at this time is entirely freed of its impurities and is thoroughly separated from the adsorbent material. It is still in the form of a dry gas, no condensation having taken place. The vapors are delivered to the condenser 7 where they are condensed, the condensates being delivered to the storage tank 10 by means of the condensate pipe 100. Any permanent gases carried in the vapor pass outward through the trap 8, the pipe 91 and the vacuum pump 9.

The removal of the impurities of a resinous or gummy character from the petroleum is complete so that the condensates delivered to the storage tank 10 are free from such impurities which appear in the activated material deposited in the blast tank 5 and the precipitator 6. These impurities form a valuable by-product which may be extracted from the adsorbent material after the same is removed from the apparatus.

The operation of the process is facilitated if the adsorbent material is delivered to the chamber 32 at a temperature equal to or greater than the vapor delivered through the pipe 21.

By the words "solid adsorptive material" as used in the appended claims, it is intended to include only the materials capable of selectively polymerizing objectionable unstable unsaturated constituents of cracked hydrocarbons which tend to discolor on exposure to light and to form deposits.

I claim as my invention:

1. The method of refining cracked petroleum products to obtain motor fuel substantially free from unstable compounds which tend to discolor on exposure to light and to form deposits which comprises passing the petroleum products in vapor phase through a treating zone, introducing finely divided dry solid adsorptive polymerizing material into said zone by means of the motive power of said vapor, and causing particles of the adsorptive polymerizing material to remain suspended in the vapor for a sufficient length of time to polymerize the unstable compounds contained in the vapor.

2. The method of refining cracked petroleum products to obtain motor fuel substantially free from unstable compounds which tend to discolor an exposure to light and to form deposits which comprises passing the petroleum products in vapor phase through a treating zone, introducing finely divided dry solid adsorptive polymerizing material into said zone by means of the motive power of said vapor and effecting polymerization of the objectionable compounds contained in said vapor, and separating from the emergent vapor particles of adsorptive polymerizing material suspended therein.

3. The method of refining cracked petroleum products to obtain motor fuel substantially free from unstable compounds which tend to discolor on exposure to light and to form deposits which comprises passing said petroleum products in vapor phase through a treating zone, introducing finely divided dry solid adsorptive polymerizing material into said zone by means of the motive power of said vapor, and effecting polymerization of the objectionable compounds contained in said vapor, and electrically precipitating from the emergent vapor particles of adsorptive polymerizing material suspended therein.

4. The method of refining cracked petroleum products to obtain motor fuel substantially free from unstable compounds which tend to discolor on exposure to light and to form deposits which comprises introducing said petroleum products in vapor phase into a treating zone, adding finely divided dry solid adsorptive polymerizing material to the vapor prior to its introduction into said zone, maintaining particles of said adsorptive polymerizing material suspended in the vapor in the zone to effect polymerization of the objectionable compounds contained in said vapor, and withdrawing the vapor and suspended material from said zone.

5. The method of refining cracked petroleum products to obtain motor fuel substantially free from unstable compounds which tend to discolor on exposure to light and to form deposits which comprises introducing said petroleum products in vapor phase into a treating zone, adding finely divided dry solid adsorptive polymerizing material to the vapor prior to its introduction into said zone, maintaining particles of said adsorptive polymerizing material suspended in the vapor in the zone to effect polymerization of the objectionable compounds contained in said vapor, withdrawing the vapor and suspended material from said zone, and separating the spent adsorptive polymerizing material from the treated vapor.

6. The method of refining cracked petroleum products to obtain motor fuel substantially free from unstable compounds which tend to discolor on exposure to light and to form deposits which comprises introducing said petroleum products in vapor phase into a treating zone, adding finely divided dry solid adsorptive polymerizing material to the vapor prior to its introduction into said zone, maintaining particles of said adsorptive polymerizing material suspended in the vapor in the zone to effect polymerization of the objectionable compounds contained in said vapor, withdrawing the vapor and suspended material from said zone, and electrically precipitating the spent solid adsorptive polymerizing material from the treated vapor.

7. The method of refining cracked petroleum products to obtain motor fuel substantially free from unstable compounds which tend to discolor on exposure to light and to form deposits which comprises passing said petroleum products in vapor phase through a treating zone, adding finely divided dry solid adsorptive polymerizing material to the vapor prior to its introduction into said zone, maintaining particles of said adsorptive polymerizing material suspended in the vapor during passage thereof through said zone to effect polymerization of the objectionable compounds contained in said vapor, and subsequently separating the spent adsorptive polymerizing material from the treated vapor.

8. The method of refining cracked petroleum products to obtain motor fuel substantially free from unstable compounds which tend to discolor on exposure to light and to form deposits which comprises passing said petroleum products in vapor phase through a treating zone, adding finely divided dry solid adsorptive polymerizing material to the vapor prior to its introduction into said zone, maintaining particles of said adsorptive polymerizing material suspended in the vapor during passage thereof through said zone to effect polymerization of the objectionable compounds contained in said vapor, and electrically precipitating the spent adsorptive polymerizing material from the treated vapor.

9. The method of refining cracked petroleum products to obtain motor fuel substantially free from unstable compounds which tend to discolor on exposure to light and to form deposits which comprises passing said petroleum products in vapor phase upwardly through a treating zone, adding finely divided dry solid adsorptive polymerizing material to the vapor prior to its introduction into said zone, maintaining particles of said adsorptive polymerizing material suspended in the vapor during its passage through said zone to effect polymerization of the objectionable compounds contained in said vapor, and separating spent adsorptive polymerizing material from the treated vapor after emergence of the same from said zone.

10. The method of refining cracked petroleum products to obtain motor fuel substantially free from unstable compounds which tend to discolor on exposure to light and to form deposits which comprises passing said petroleum products in vapor phase upwardly through a treating zone, adding finely divided dry solid adsorptive polymerizing material to the vapor prior to its introduction into said zone, maintaining particles of said adsorptive polymerizing material suspended in the vapor during its passage through said zone to effect polymerization of the objectionable compounds contained in said vapor, and electrically precipitating spent adsorptive polymerizing material from the treated vapor after emergence of the same from the treating zone.

11. The method of refining cracked petroleum products to obtain motor fuel substantially free from unstable compounds which tend to discolor on exposure to light and to form deposits which comprises introducing said petroleum products in vapor phase into the lower portion of a treating zone, adding finely divided dry solid adsorptive polymerizing material to the vapor prior to its introduction into said zone, maintaining particles of adsorptive polymerizing material suspended in the vapor in said zone to effect polymerization of the objectionable compounds contained in said vapor, withdrawing the vapor and suspended adsorptive polymerizing material from the top of said zone and separating the spent adsorptive polymerizing material from the treated vapor.

12. The method of refining cracked petroleum products to obtain motor fuel substantially free from unstable compounds which tend to discolor on exposure to light and to form deposits which comprises introducing said petroleum products in vapor phase into the lower portion of a treating zone, adding finely divided dry solid adsorptive polymerizing material to the vapor prior to its introduction into said zone, maintaining particles of adsorptive polymerizing material suspended in the vapor in said zone to effect polymerization of the objectionable compounds contained in said vapor, withdrawing the vapor and suspended adsorptive polymerizing material from said zone, and electrically precipitating the spent adsorptive polymerizing material to separate the same from the treated vapor.

13. The method of refining cracked petroleum products to obtain motor fuel substantially free from unstable compounds which tend to discolor on exposure to light and to form deposits which comprises introducing said petroleum products in vapor phase into a treating zone, adding finely divided dry solid adsorptive polymerizing material to the vapor prior to its introduction into said zone, maintaining in contact with the vapor while in motion in said zone particles of said adsorptive polymerizing material temporarily suspended in the vapor to effect polymerization of the objectionable compounds contained in said vapor.

14. The method of refining cracked petroleum products to obtain motor fuel substantially free from unstable compounds which tend to discolor on exposure to light and to form deposits which comprises introducing said petroleum products in vapor phase into a treating zone, adding finely divided dry solid adsorptive polymerizing material to the vapor prior to its introduction into said zone, maintaining in contact with the vapor while in motion in said zone particles of said adsorptive polymerizing material temporarily suspended in the vapor to effect polymerization of the objectionable compounds contained in said vapor, and subsequently separating the spent adsorptive polymerizing material from the treated vapor.

15. The method of refining cracked petroleum products to obtain motor fuel substantially free from unstable compounds which tend to discolor on exposure to light and to form deposits which comprises introducing said petroleum products in vapor phase into a treating zone, adding finely divided dry solid adsorptive polymerizing material to the vapor prior to its introduction into said zone, maintaining in contact with the vapor while in motion in said zone particles of said adsorptive polymerizing material temporarily suspended in the vapor to effect polymerization of the objectionable compounds contained in said vapor, and subsequently electrically precipitating the adsorptive polymerizing material to separate the same from the treated vapor.

16. The method of refining cracked petroleum products to obtain motor fuel substantially free from unstable compounds which tend to discolor on exposure to light and to form deposits which comprises passing said petroleum products in vapor phase through a treating zone, introducing finely divided dry solid adsorptive polymerizing material into said zone by means of the motive power of said vapor, causing particles of the adsorptive polymerizing material to remain suspended in the vapor for a sufficient length of time to polymerize the undesirable compounds present in the vapor, withdrawing the vapor and suspended material from said zone, separating the spent adsorptive polymerizing material from the treated vapor, and condensing the treated vapor in vacuo.

17. The method of refining cracked petroleum products to obtain motor fuel substantially free from unstable compounds which tend to discolor on exposure to light and to form deposits which comprises passing said petroleum products in vapor phase through a treating zone, introducing finely divided dry solid adsorptive polymerizing material into said zone by means of the motive power of said vapor, causing particles of the adsorptive polymerizing length of time to polymerize the undesirable compounds present in the vapor, withdrawing the vapor and suspended adsorptive polymerizing material from said zone, electrically precipitating the spent adsorptive material to separate the same from the treated vapor and condensing the treated vapor in vacuo.

18. The method of refining cracked petroleum products to obtain motor fuel substantially free from unstable compounds which tend to discolor on exposure to light and to form deposits which comprises passing said petroleum products in vapor phase through a treating zone, introducing dry finely divided acid-activated clay into said zone by means of the motive power of said vapor, and maintaining particles of said activated clay suspended in the vapor in the zone for a sufficient length of time to polymerize the undesirable compounds present in the vapor.

19. A method of purifying vapors of hydrocarbon oil which comprises, introducing dry, comminuted adsorptive clay into a vapor treating tower by means of the motive power of the vapors to be treated and causing the particles of clay to remain suspended in the vapors for a sufficient length of time to exert the desired effect.

WALTER S. BAYLIS.